United States Patent [19]

Cudlitz

[11] Patent Number: 4,471,276
[45] Date of Patent: Sep. 11, 1984

[54] ELECTRIC MOTOR SPEED CONTROLLER AND METHOD

[76] Inventor: Stephen Cudlitz, 5 Waldron Ct., Marblehead, Mass.

[21] Appl. No.: 534,374

[22] Filed: Sep. 21, 1983

Related U.S. Application Data

[63] Continuation of Ser. No. 321,819, Nov. 16, 1981, abandoned, which is a continuation of Ser. No. 159,343, Jun. 13, 1980, abandoned.

[51] Int. Cl.$^3$ .............................................. H02P 5/16
[52] U.S. Cl. .................................... 318/341; 318/139
[58] Field of Search ................ 318/139, 341; 323/784, 323/288, 242, 243, 326; 363/26; 330/10

[56] References Cited

U.S. PATENT DOCUMENTS

| | | | |
|---|---|---|---|
| 3,260,912 | 7/1966 | Gregory | 318/341 |
| 3,349,309 | 10/1967 | Dannettell | 318/341 |
| 3,354,371 | 11/1967 | Ainsworth et al. | 318/341 |
| 3,358,206 | 12/1967 | Thiele | 318/341 |
| 3,560,829 | 2/1971 | Brennan | 318/681 |
| 3,743,911 | 7/1973 | Erler | 318/341 |
| 3,803,471 | 4/1974 | Price et al. | 318/341 |
| 3,912,994 | 10/1975 | Stovall | 318/341 |

FOREIGN PATENT DOCUMENTS

| | | |
|---|---|---|
| 1004326 | 9/1965 | United Kingdom . |
| 1065523 | 4/1967 | United Kingdom . |
| 1072936 | 6/1967 | United Kingdom . |
| 1152144 | 5/1969 | United Kingdom . |
| 1179761 | 1/1970 | United Kingdom . |
| 1240319 | 7/1971 | United Kingdom . |
| 1399468 | 7/1975 | United Kingdom . |
| 1425848 | 2/1976 | United Kingdom . |

*Primary Examiner*—David Smith, Jr.
*Attorney, Agent, or Firm*—Michael L. Dunn

[57] ABSTRACT

An electric motor speed controller circuit which comprises at least one power transistor in series between the motor and a power supply to form a power circuit such that current flows between the power supply and the motor through the transistor only when a signal current is supplied to the base of the transistor and which further comprises a control circuit for supplying a signal to the base of the transistor which signal is pulse width modulated so that the width of the pulse is proportional to the value of a variable resistance, inductance or capacitance of the speed control;

a method for controlling the speed of an electric motor which comprises varying the resistance, inductance or capacitance of a speed control and supplying a pulse width modulated signal current, having pulse widths proportional to the value of the varied resistance, capacitance or inductance, to the base of at least one power transistor to activate the transistor which is connected by its emitter and collector, as an electrical switch in series between the motor and a power supply;

a variable speed motor controlled by the speed controller circuit; and a vehicle powered by a motor controlled by the speed controller circuit.

12 Claims, 7 Drawing Figures

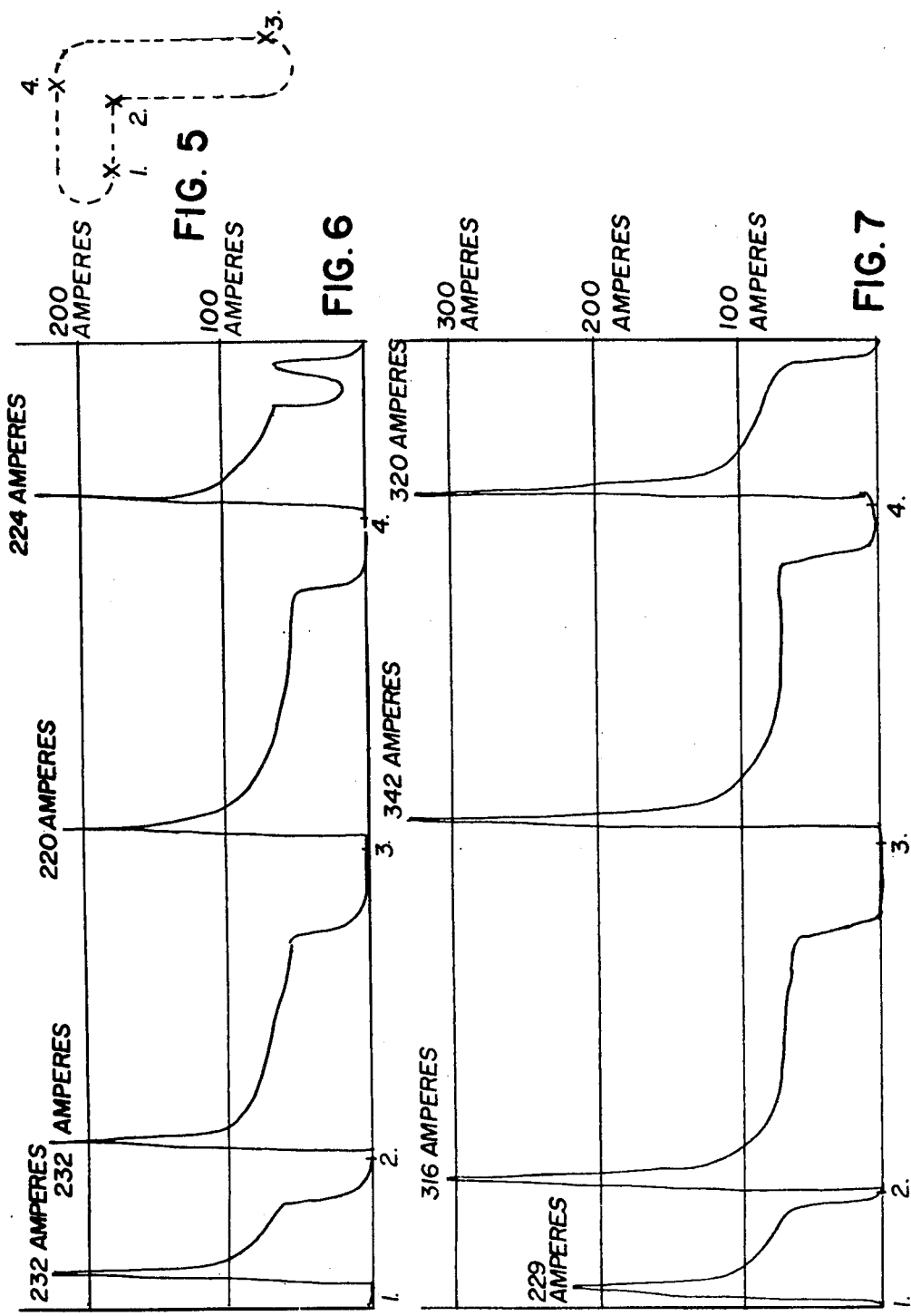

ELECTRIC MOTOR SPEED CONTROLLER AND METHOD

This is a continuation of application Ser. No. 321,819 filed Nov. 16, 1981 which in turn is a continuation of application Ser. No. 159,343 filed June 13, 1980, both now abandoned.

BACKGROUND OF THE INVENTION (A) Field of the Invention

This invention relates to speed controllers for electric motors and especially relates to speed controllers for electric motors, particularly series-field motors, used to drive battery powered electric vehicles.

(B) History of the Prior Art

In the prior art, motors, especially DC electric motors, were generally controlled by the use of an adjustable large current series resistance. This method of controlling the speed of an electric motor, particularly those used to drive electric vehicles, has been generally unsatisfactory because torque and speed are almost completely interdependent. The interdependency results in very poor speed regulation. In addition, such resistance controllers are extemely inefficient due to high dissipation of electrical energy through the controller resistance elements. This energy dissipation markedly reduces battery life and the allowable time between charges and also increases the minimum acceptable initial size, weight and cost of the battery.

Furthermore, such controllers did not result in fully proportional speed control since frequently the controllers had to be almost in the fully on position before sufficient torque could be developed to start an electric vehicle from a stopped position. The controller would then have to be backed off to reduce the torque after motion started. Such controllers therefore resulted in inconsistent non-uniform motor operation giving a "jerky" feel to the movement of a vehicle.

More recently, an attempt has been made to control the speed of an electric motor by placing a power transistor as an electronic switch between the battery and the motor and activating the transistor by supplying pulses of current to the transistor base. In general, these pulses were of constant duration and the speed was controlled in only a few stages by chopping a current at only a few different speeds. The resulting motor operation is non-uniform, and electrical energy is wasted since current is supplied only at a few levels.

BRIEF DESCRIPTION OF THE INVENTION

In accordance with with the present invention, there is provided an electric motor speed controller circuit which overcomes essentially all of the previously mentioned disadvantages of prior art controller circuits. In particular, the electric motor speed controller circuit, in accordance with the present invention, is interposed between the motor and a power supply sufficient to drive the motor. The speed controller circuit comprises at least one power transistor connected through its emitter and collector in series between the motor and the power supply to form a power circuit such that current flows between the power supply and the motor through the transistor only when a signal current is supplied to the base of the transistor. The speed controller further comprises a speed control which provides a variable resistance, inductance or capacitance within a control circuit and a control circuit having a power requirement substantially lower than the power requirement to operate the motor which supplies pulses of a pulse width modulated signal current to the base of the power transistor, the width of the pulse being proportional to the value of the variable resistance, inductance or capacitance of the speed control.

The invention further comprises a method for controlling the speed of an electric motor. The method comprises varying the variable resistance, inductance or capacitance of a speed control; and supplying a pulse width modulated signal current, having pulse widths proportional to the value of the variable resistance, inductance, or capacitance, to the base of at least one power transistor to activate the transistor which is connected by its emitter and collector as an electrical switch in series between the motor and a power supply.

The invention further comprises a variable speed motor connected with and controlled by the electrical motor speed controller of the invention and an electrical vehicle powered by a motor controlled by the electric motor speed controller of the invention.

BRIEF DESCRIPTION OF THE DRAWINGS

FIG. 5 is a schematic layout of a ¼ mile test course.

FIG. 6 is a power curve showing the power used by a golf car controlled with the solid state controller of the invention as the golf car moves around the test course shown in FIG. 5; and FIG. 7 is a power curve showing the same golf car as FIG. 6 wherein a resistor controller is used as the golf car travels the test course of FIG. 5.

DETAILED DESCRIPTION OF THE INVENTION

Figure 1:
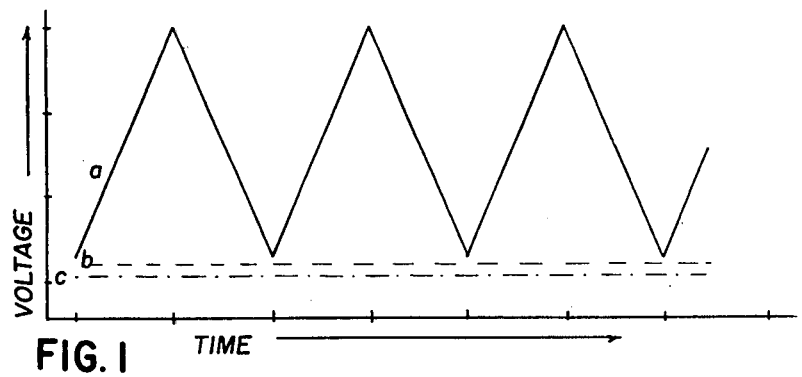
FIGS. 1, 2 and 3 are representative graphs showing the relationship between the EMF's of an electrical voltage proportional to the resistance, capacitance or inductance of a speed control, the electrical voltage of a comparison saw tooth wave generated by the control circuit and the electrical voltage of a pulse modulated output signal.

The electric motor controlled by the speed controller circuit of the invention may be any electric motor but is usually a direct current (DC) electric motor which most often has a series-field.

The power supply is any power supply sufficient to drive the motor and for a DC motor is a DC power supply which may have a uniform or variable EMF. Usually the power supply is a battery of any suitable type including one or more packaged batteries in series or parallel. Suitable batteries include rechargeable batteries such as lead-acid batteries; nickel-cadminum batteries and the newer lithium-chloride batteries.

As previously discussed, the speed controller circuit comprises at least one power transistor connected through its emitter and collector in series between the motor and the power supply to form a power circuit such that the current flows through the transistor from the power supply to the motor only when a signal current is supplied to the base of the transistor.

The power transistor is a single transistor or coupled transistors which act as a single transistor. The power transistor is desirably a bistable transistor, i.e., a transistor whose base current controls both on and off switching but under certain circumstances may be a thyrister or in the case of an alternating current, a triac. Examples of power transistors are power Darlington connected transistors. Examples of suitable particular transistors are Motorola's MJ11028 Darlington and RCA's Series SK3570 through SK3582.

A plurality of such power transistors can be used in parallel to increase the current carrying capability of the circuit.

The speed control, which is usually manually operated, i.e., operated by human action such as a footpedal or a hand operated accelerator, provides a variable resistance, inductance or capacitance within the control circuit. The speed control usually provides a variable resistance within the circuit by means of a rheostat.

The control circuit is designed to have a power requirement substantially lower than the power requirement to operate the motor. The control circuit usually requires less than 10 and preferably less than 5% of the power requirement of the motor. The control circuit supplies pulses of a pulse width modulated signal current to the base of the power transistor or transistors, the width of the pulse being proportional to the value of the variable resistance, inductance or capacitance of the speed control.

Pulse width modulation (PWM) is also known as pulse duration modulation (PDM) or pulse length modulation (PLM). In general, pulse width modulation is that modulation of a signal at an essentially constant frequency where a time length or width of pulses of a constant EMF signal are varied in relation to an input signal. The longer the width of the modulation, the more current is supplied with the signal and the shorter the width of the modulation, the less current is supplied with the signal.

Numerous methods are known to those skilled in the art for creating a pulse width modulated signal since the signals have been examined in the area of electronics communication and to a lesser extent in the area of electronic controllers in other applications (see references on page 14-51 of the Electronics Engineers' Handbook edited by Donald G. Fink, published by McGraw-Hill, 1975).

In accordance with a preferred embodiment of the present invention, the control circuit comprises a means for generating a constant frequency electrical voltage wave form biased so that the lowest voltage of the wave is greater than zero; a means for generating a voltage proportional to the variable resistance, inductance or capacitance of the speed control and a means for comparing the voltage of the wave form with the generated proportional voltage and for outputting a pulse width modulated signal to the base of the power transistor when the generated proportional voltage is greater than the voltage of the electrical wave form. The constant frequency electrical voltage wave form is most desirable a saw tooth wave form so that the lengths of the outputted signal pulses are directly proportional to the generated proportional voltage, although other constant frequency wave forms can be used so that other proportional relationships can be obtained between the generated proportional voltage and the lengths of the outputted signal pulses.

"Proportional", as used herein, means having the same or constant ratio or a ratio which varies in accordance with a set mathematical function. In general, the proportional relationship, in accordance with the preferred embodiment of the invention, is a direct proportion and optionally, a proportion which varies exponentially, logarithmically or trigonometrically.

FIG. 1 of the drawings shows a graph of voltage against time for a generated constant frequency saw tooth electrical voltage wave, (a), a voltage proportional to the variable resistance when the resistance is exceedingly high thus producing a proportional voltage (b) which is lower than the lowest voltage of the constant frequency electrical voltage wave (a) and the resulting outputted pulse width modulated wave (c) which has no pulses (pulse width zero) since at no time is the generated proportional voltage greater than the voltage of the constant frequency electrical voltage wave.

Figure 2:
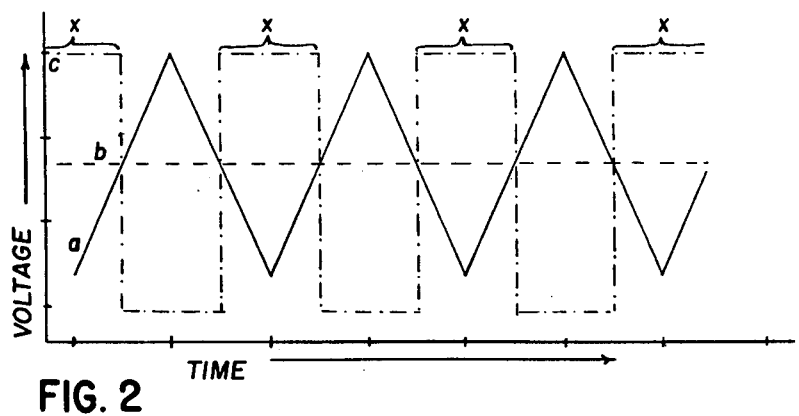
Figure 3:
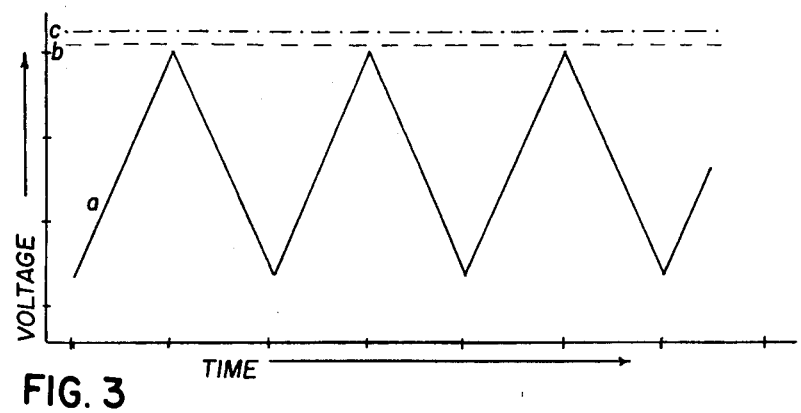

FIG. 2 shows essentially the same curve as FIG. 1 except that the proportional voltage (b) is sometimes greater than and sometimes less than the voltage of constant frequency electrical voltage wave (a) which results in pulses (x) which are outputted to the base of the power transistor in original or amplified form, the length of pulse (x) representing the current flow to the base of the transistor. The width of pulse (x) of wave (c) is determined by the length of time that the proportional voltage is greater than the voltage of the contant frequency electrical voltage wave form. FIG. 3 again shows essentially the same relationship except that generated proportional voltage (b) is always greater than the voltage of constant frequency electrical voltage wave form (a) thus the generated current pulses (x) of wave (c) have essentially merged into a constant high current flow to the base of the power transistor.

As can be seen from these figures, the current flow to the base of the transistor is proportionally varied depending upon the proportional voltage which is generated in response to the resistance, inductance or capacitance of the speed control thus the current flow to the base of the power transistor is also constantly varied in relationship to the variable resistance, inductance or capacitance and as a result, the current flow from the power source through the power transistor to the motor is also constantly varied in relationship to the resistance, inductance or capacitance of the speed control.

The speed control therefore varies the current flow to the motor through the motor controller circuit and has essentially no effect upon the voltage applied to the motor during current pulses.

This desirable result is contrary to the results obtained using prior art electronic motor control circuits.

Optionally and desirably, means is provided for stopping available signal currents to the base of the power transistor when current through the power circuit is greater than a maximum desired level and for restoring available signal currents when the current through the power circuit is again below the maximum desired level. This means is desirably present to prevent the power circuit from being overloaded. Any means known to those skilled in the art for detecting current overload and shutting off a signal in response to such detection can be used. In a preferred embodiment of the invention, a direct current EMF is selected which will decrease through an operational amplifier as current through a calibrated portion of the cable from a DC power supply increases. When the selected EMF is reduced to a sufficiently low level, another operational amplifier turns on which forces a third operational amplifier off which in turn clamps the generated voltage proportional to the variable resistance, inductance or capacitance to a level below the lowest voltage of the saw tooth or triangular wave form. This results in no pulses being sent to the base of the power transistor thus effectively stopping current flow through the motor.

There is also optionally and desirably provided a means for stopping available signal currents to the base of the power transistor when battery voltage falls below the desired minimum voltage to drive the motor and means for restoring available signal currents when the battery voltage is again above the minimum desired voltage to drive the motor. Again, any means known to those skilled in the art for detecting voltage drop and for stopping a signal to the base of the transistor as a result of such detection can be used. In the preferred embodiment of the invention, an operational amplifier is caused to turn on if the voltage drops below a predetermined level. When the operational amplifier is on, the generated proportional voltage is again clamped below the lowest voltage level of the triangular wave form, again forcing the output to the base of the power transistor to be zero or at least too low to activate the transistor.

The same or similar circuits can also be used as failsafe mechanisms to turn off the power transistor when open circuit or short circuit conditions are detected.

The frequency of the saw tooth or triangular wave form and the frequency of the pulse width modulated signal is desirably selected to be compatible with motor operating characteristics.

The method of the invention for controlling the speed of an electric motor comprises varying the resistance, inductance or capcacitance of a speed control, preferably manually, and supplying a pulse width modulated signal current having pulse widths proportional to the value of the variable resistance, capacitance or inductance to the base of at least one power transistor to activate the transistor which is connected by its emitter and collector as an electrical switch in series between the motor and the power supply.

The controller and method of the invention are more efficient and superior for controlling the speed of a DC motor and, when a triac is used as the power transistor, can even be more efficient in controlling the speed of an AC motor. The circuit does not have the power loss inherent in a control circuit using resistors or chopped pulses which are not pulse width modulated. Contrary to the results obtained with prior art controllers, the controller of the invention provides a variable current supply depending upon the current requirement of the motor in response to both motor characteristics and the variable resistance, inductance or capacitance of the speed control. Furthermore, the pulse widths of the signal to the base of the power transistor or transistors can be made directly proportional to the variance in the resistance, inductance or capacitance of the speed control. The result is a smoothly operating motor which uses less current than was possible using prior art controller circuits and with less "jerk" of the motors in response to current surges provided by prior art controller circuits which "jerk" is undesirable for smooth operation, good motor performance and good motor wear.

Figure 4:
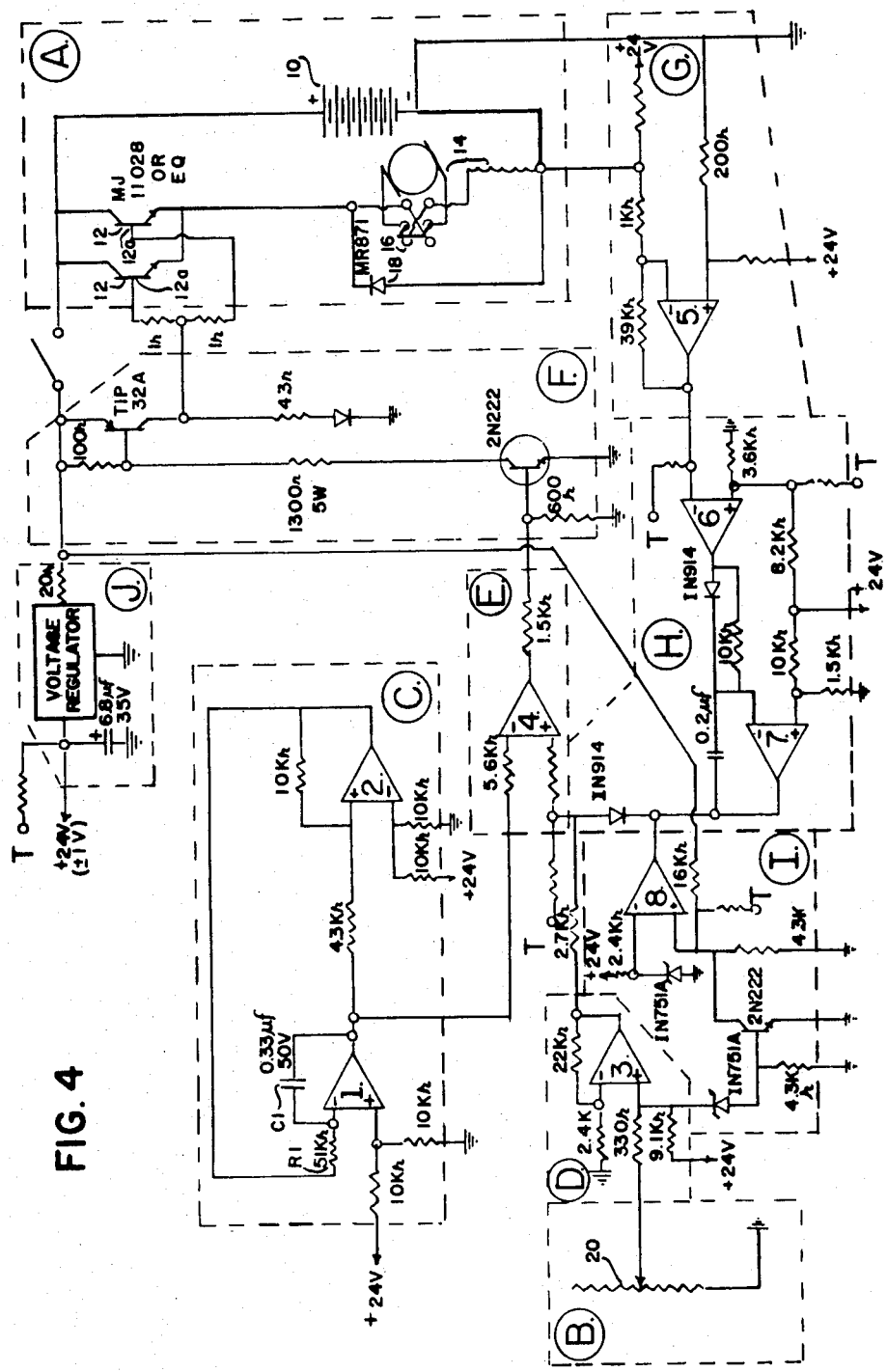
FIG. 4 is a schematic diagram of a preferred embodiment of the electric motor speed controller of the invention.

A schematic diagram of a preferred controller circuit, in accordance with the invention, is set forth in FIG. 4.

The schematic diagram of FIG. 4 has been divided by dotted boxed into various circuit components for ease of explanation. The dotted box represented by A is the power circuit wherein electric current from battery 10 passes through power transistors 12 to motor 14 through reversing switch 16. A free wheeling diode 18 is provided which provides a current path for electrical currents generated by motor rotation caused by coasting of the motor and apparatus connected to the motor.

Power transistors 12 act as electronic switches which are turned on by a signal provided to transistor bases 12A. A signal is a wave form which is pulse width modulated in proportion to a variable resistance which is manually altered as in the form of a rheostat represented within dotted box B of FIG. 4. The rheostat, in the case of an electric vehicle, is usually changed by means of a footpedal.

In order to generate the pulse width modulated signal, a saw tooth wave form is generated by means of the circuit represented by dotted box C. The triangular shaped circuit components, 1 through 8, as shown in FIG. 4 are operational amplifiers which may be discrete components or one or more may be combined in a single electronic package. The operational amplifiers used in accordance with the embodiment shown in FIG. 4 are National quad operational amplifiers LM324N wherein each triangle shown in FIG. 4 represents one-fourth of the quad operational amplifier package.

The frequency of the triangular or saw tooth wave form generated by a circuit enclosed by dotted box C can be altered by changing the values of resistance R1 and/or capacitance C1. The triangular wave form is offset from ground preferably by about 5.5 volts with a 13 volt peak to peak swing.

The circuit represented by dotted box D generates an EMF which is directly proportional to the value of rheostat 20. The signal from circuit D is provided to the circuit represented within dotted box E which compares the signal from circuit D with the triangular wave form from circuit C. If the voltage of the signal from circuit D is larger than the voltage of the triangular wave form from circuit C, current pulse is input from circuit E to circuit F which amplifies the pulse and provides the amplified pulse to the bases of power transistors 12 which turns the power transistors on thus permitting current to flow from battery 10 to motor 14. As was previously explained, with respect to FIGS. 1, 2 and 3, the length of the current pulse to the bases of transistors 12 from circuits E and F is dependent upon the voltage of a signal from circuit D in response to the variable resistance of circuit B.

In the preferred embodiment shown in FIG. 4, safety circuits are also provided. The circuits represented by the dotted boxes G and H shut down the signal to the bases 12A of power transistors 12 when current through the power circuit A is too high. Similarly, circuit I shuts down the signal to bases 12A of power transistors 12 when a brownout or low voltage condition exists.

It is to be understood that the schematic diagram of FIG. 4 is only one of many possible circuit arrangements in accordance with the invention and even in the schematic diagram of FIG. 4, circuit components, e.g., resistances, can be changed to balance the circuit for the characteristics of somewhat different motors, batteries, resistances, capacitors, speed controls, regulators, transistors diodes and operational amplifiers. Different but similar components may therefore be substituted in the circuit with corresponding appropriate changes in other components.

In addition, if desired, a capacitive or inductive reactance can be added in parallel with the pulse width modulated signal in any control circuit of the invention to create a smoother transition in signal EMF and/or current to the base of the power transistor or optionally, if the capacitance or inductance is large enough, the reactance may even be added in parallel with the power circuit. The motor windings themselves add a reasonably large inductance to the power circuit to smoothen changes in the signal.

A controller circuit essentially as shown in FIG. 4 was incorporated into a Melex golf car with total gross weight of 1,615 pounds (including the weight of the car). The golf car with the electric motor speed controller circuit of the present invention traveled over thirty miles with repeated dead stops followed with normal acceleration and at the end of the thirty miles, there was still sufficient charge in the batteries to keep driving the golf car.

In a test for normal operations, a Melex golf car, having a total gross weight of 1,493 pounds controlled with an electric motor speed controller circuit in accordance with the invention, we able to travel thirty-six holes on a hilly golf course with less than 50% battery discharge.

In a comparative test, a Melex golf car, having a total gross weight of 1,615 pounds, was tested with a prior art resistance motor controller and the motor speed controller circuit of the present invention around a one-fourth mile test course having the configuration set forth in FIG. 5. The relative power requirement and power drain between the golf car with the controller of the present invention and the golf car with the resistor controller are set forth in FIGS. 6 and 7 respectively. The comparison of these Figures clearly shows that at various stops at positions 1, 2, 3 and 4, the current drain utilizing the electric motor speed controller of the invention is consistently less and furthermore, the top speed is higher than the golf car wherein the state of the art resistance controller is used.

What is claimed is:

1. A direct current electric motor speed controller circuit between the motor and a power supply sufficient to drive the motor which controller consists essentially of:
    (a) at least one power transistor connected through its emitter and collector in series between the motor and the power supply to form a power circuit such that current flows between the power supply and the motor through the transistor only when a signal current is supplied to the base of the transistor;
    (b) a speed control which provides a variable resistance, inductance or capacitance within a control circuit;
    (c) a control circuit having a power requirement substantially lower than the power requirement to operate the motor, said control circuit supplying pulses of a pulse width modulated signal current to the base of the power transistor, the width of the pulse being proportional to the value of the variable resistance, inductance or capacitance of the speed control, said control circuit comprising:
        (i) means for generating a constant frequency saw toothed electrical voltage wave form biased so that the lowest voltage of the wave is greater than zero;
        (ii) a means for generating a voltage proportional to the variable resistance, inductance or capacitance; and
        (iii) a means for comparing the voltage of the saw toothed wave form with the generated proportional voltage and for outputting a direct current pulse width modulated signal to the base of the power transistor when the generated proportional voltage is greater than the voltage of the electrical wave form, the width of the pulses of said pulse width modulated signal being directly proportional to the generated proportional voltage;
    (d) means for stopping available signal currents to the base of the power transistor when current through the power circuit is greater than a maximum desired level and for restoring available signal currents when the current through the power circuit is again below the maximum desired level; and
    (e) means for stopping available signal currents to the base of the power transistor when power supply voltage falls below the desired minimum voltage to drive the motor;

the means for generating a constant frequency saw toothed wave, the means for generating a proportional voltage, the means for comparing the voltage of the saw toothed wave form with the proportional voltage, the means for stopping available signal currents to the base of the power transistor when current through the power circuit is greater than a maximum desired level and the means for stopping available signal currents to the base of the power transistor when the power supply voltage falls below the desired minimum voltage to drive the motor each comprising at least a part of at least one integrated circuit.

2. The motor controller circuit of claim 1 wherein the speed control provides a variable resistance within the control circuit.

3. The motor controller circuit of claim 1 wherein the speed control is manually operated to vary the resistance.

4. The motor controller circuit of claim 1 wherein the outputed signal pulses are amplified before being transmitted to the base of the power transistor.

5. The motor controller circuit of claim 1 wherein a control switch is provided between the power supply and the control circuit.

6. The motor controller circuit of claim 1 wherein the power supply is a battery.

7. The motor controller circuit of claim 1 wherein a reactance is provided in parallel with the motor.

8. A variable speed motor comprising a motor connected with and controlled by the electric motor speed controller circuit of claim 1.

9. An electric vehicle powered by a motor controlled by the electric motor speed controller circuit of claim 1.

10. The electric vehicle of claim 8 wherein the vehicle is a golf cart.

11. The electric vehicle of claim 8 wherein the vehicle is an electric automobile.

12. A method for controlling the speed of a direct current electric motor which consists essentially of:
    (a) varying a variable resistance, inductance or capacitance of a speed control;
    (b) providing a constant frequency saw toothed electrical voltage wave form biased so that the lowest voltage of the wave is greater than zero, utilizing at least a part of an integrated circuit;
    (c) providing a voltage proportional to the value of the variable resistance, inductance or capacitance, utilizing at least a part of an integrated circuit;
    (d) comparing the voltage of the saw toothed wave form with the voltage proportional to the resistance, inductance or capacitance, utilizing at least a part of an integrated circuit;

(e) outputing a direct current pulse width modulated signal when the proportional voltage is greater than the voltage of the electrical voltage wave form; the width of the pulses of said pulse width modulated signal being directly proportional to the generated proportional voltage, utilizing at least a part of an integrated circuit;

(f) supplying said pulse width modulated signal current, to the base of at least one power transistor to activate the transistor which is connected by its emitter and collector, as an electrical switch in series between the motor and a power supply;

(g) stopping available signal currents to the base of the power transistor when current through the motor is greater than a maximum desired level and for restoring available signal currents when the current through the motor is again below the maximum desired level, utilizing at least a part of an integrated circuit; and (h) stopping available signal currents to the base of the power transistor when battery voltage falls below the desired minimum voltage to drive the motor, utilizing at least a part of an integrated circuit.

* * * * *